Figure 1:
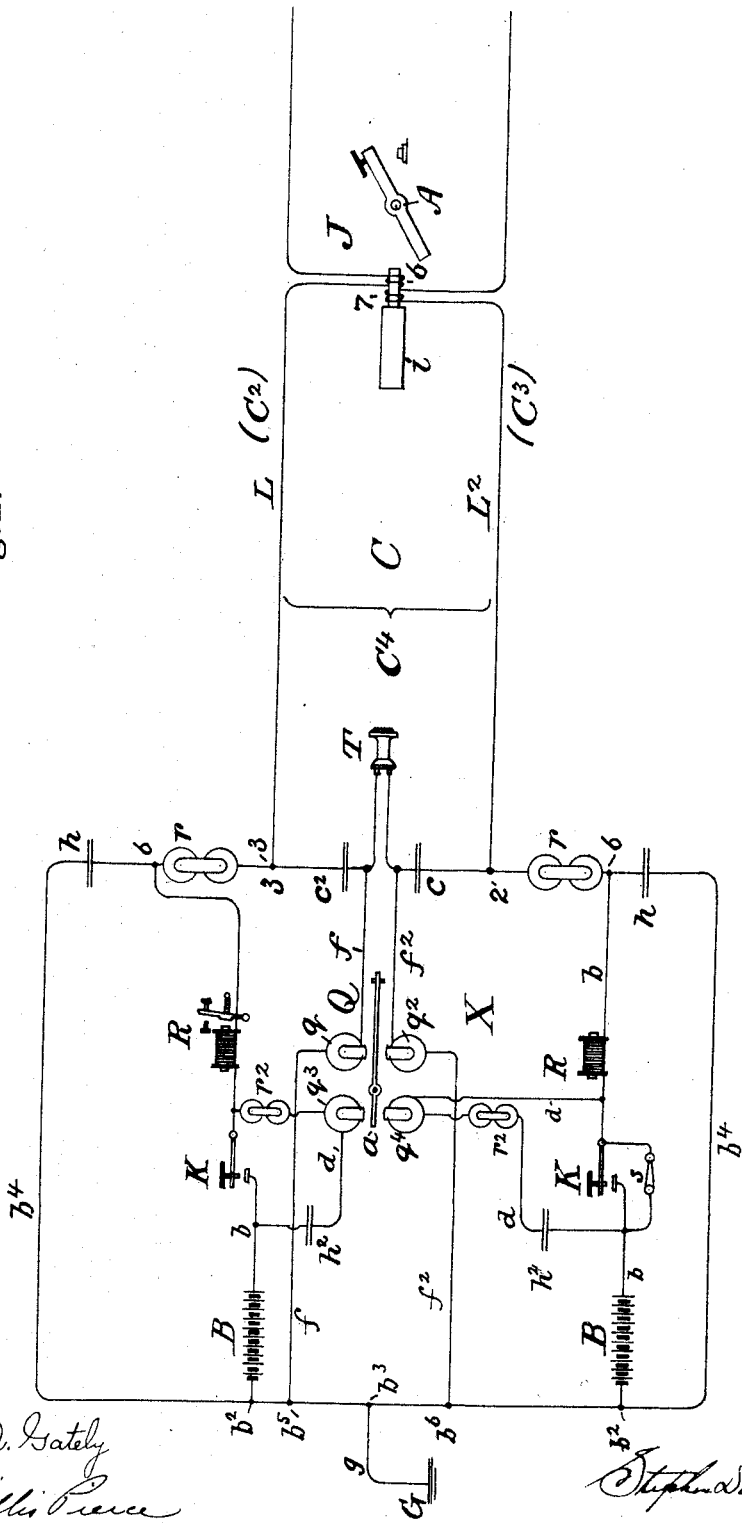

No. 619,157. Patented Feb. 7, 1899.
S. D. FIELD.
COMPOSITE SIGNALING AND TRANSMISSION SYSTEM.
(Application filed Dec. 24, 1897.)
(No Model.) 4 Sheets—Sheet 1.

Attest.
Joseph A. Gately
Geo. Willis Pierce

Inventor.
Stephen Dudley Field

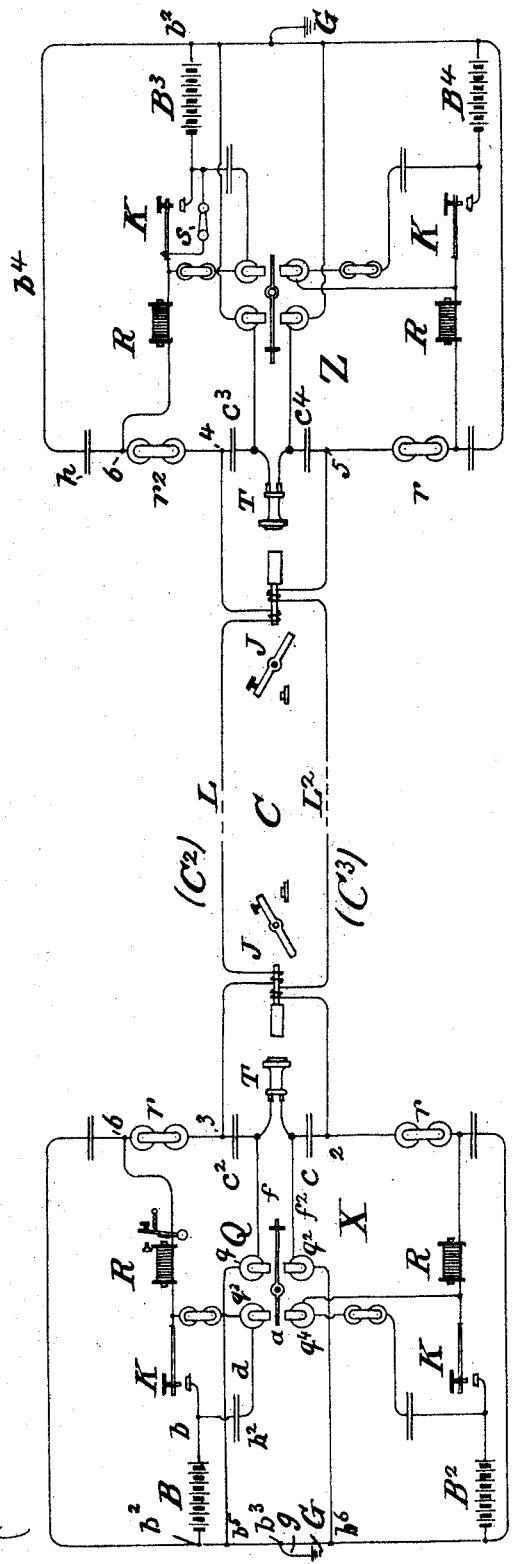

No. 619,157. Patented Feb. 7, 1899.
S. D. FIELD.
COMPOSITE SIGNALING AND TRANSMISSION SYSTEM.
(Application filed Dec. 24, 1897.)
(No Model.) 4 Sheets—Sheet 3.

Attest.
Joseph A. Gately

Inventor,
Stephen Dudley Field

No. 619,157. Patented Feb. 7, 1899.
S. D. FIELD.
COMPOSITE SIGNALING AND TRANSMISSION SYSTEM.
(Application filed Dec. 24, 1897.)

(No Model.) 4 Sheets—Sheet 4.

Attest.
Joseph A. Gately
Gromillis Pierce

Inventor
Stephen Dudley Field

UNITED STATES PATENT OFFICE.

STEPHEN DUDLEY FIELD, OF STOCKBRIDGE, MASSACHUSETTS, ASSIGNOR TO THE AMERICAN BELL TELEPHONE COMPANY, OF BOSTON, MASSACHUSETTS.

COMPOSITE SIGNALING AND TRANSMISSION SYSTEM.

SPECIFICATION forming part of Letters Patent No. 619,157, dated February 7, 1899.

Application filed December 24, 1897. Serial No. 663,369. (No model.)

*To all whom it may concern:*

Be it known that I, STEPHEN DUDLEY FIELD, residing at Stockbridge, in the county of Berkshire and State of Massachusetts, have invented certain Improvements in Composite Signaling and Transmission Systems, of which the following is a specification.

This invention relates to composite systems for the electrical transmission of intelligence, and more particularly to that class wherein the two line conductors or sides of an inductively-neutral metallic telephone-circuit are severally employed as the single line conductors, respectively, of two telegraphic circuits.

Generally stated, the object of my invention is the simultaneous transmission of a fourth communication over the same main conductors; and the invention consists in means for obtaining such a fourth simultaneous transmission of telegraphic or similar signals over a two-wire circuit already occupied by one telephonic and two telegraphic installations, in the several combinations of conductors, apparatus, and both which result in the production of four distinct operative circuits from but two line conductors, and in an improved composite system of intelligence transmission wherein a metallic telephonic circuit and two distinct earth-completed telegraphic circuits, all formed of the same two line conductors, (which are connected in series to constitute the telephonic circuit and severally as the telegraphic circuits, respectively,) are combined with a third earth-completed telegraphic or signaling circuit having its line constituted of the same two conductors arranged in parallel, so as to form a single conductor of double cross-section.

The composite system herein described comprehends an inductive transmitter organized to impart simultaneous longitudinal and pendulous motion to its moving element or inducing medium, and thereby to develop true curve impulses, which are manifested in the circuit as true reversals of current or absolutely equal successively-reversed current impulses on both sides of the circuit at the same time. These accurate reversals are too brief in duration to pass the retardation or impedance coils which are associated with the telegraphic circuits formed of the two line-wires severally, and are, moreover, too smooth in definition to affect the telephones or disturb the telephonic circuit, besides being approximately balanced at the telephone-terminals, similar potentials reaching both telephones simultaneously.

The system involving my improvement is elastic in its nature in that it is readily conformable to harmonic telegraphy, provided that the rate of vibration is kept at a rate below that needed to produce a musical note. It is, however, in this specification described and in the drawings accompanying the same shown as being arranged to work in a manner similar to that of the induction-telegraph of Siemens and Halske described and illustrated in *The Electric Telegraph*, Robert Sabine, pages 136 to 138, London, 1867.

My apparatus, however, is essentially different from that used by Siemens, and necessarily so in order that it may be satisfactorily worked in association with the original telegraphic and telephonic circuits of the combination system.

I have ascertained by experiment that signals can be transmitted by using true reversals, or reversed current impulses, in which the impulse in each direction is a facsimile of the other, at a speed far exceeding any within the capabilities of a Morse operator, which signals will, however, be absolutely inaudible in a telephone-receiver contained in the circuit. To obtain this result, the transmission must be effected without in any way impairing the integrity of the circuit or producing any violent or abrupt change in the potential thereof or its manner of distribution.

Signals can be transmitted by my apparatus at a rate of fifteen per second, and as five per second is a good speed for the ordinary transmission of Morse signals it is evident that I obtain a sufficiently wide margin.

Figure 4:
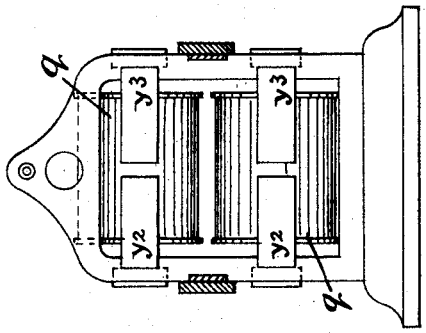
Figure 3:
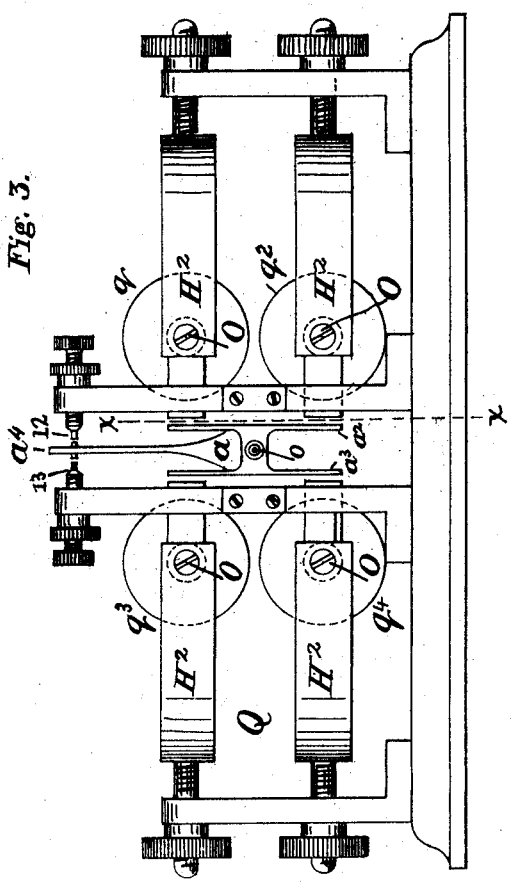
Figure 5:
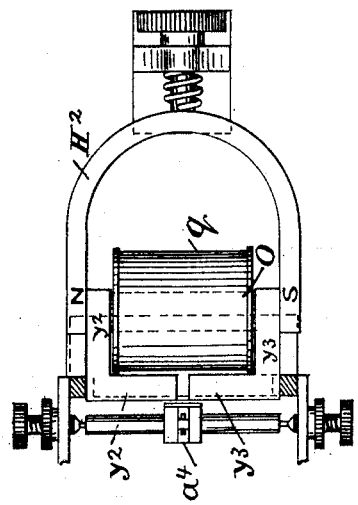
Figure 7:
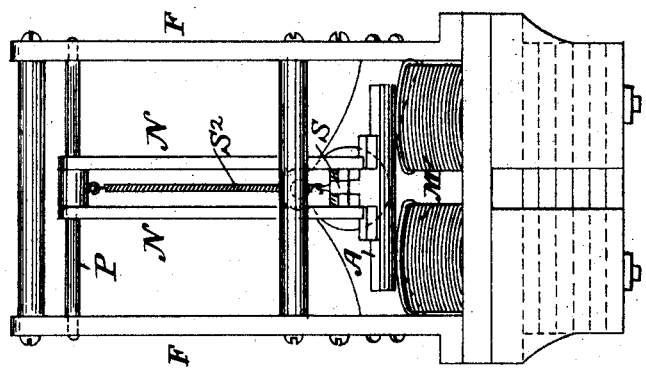
Figure 6:
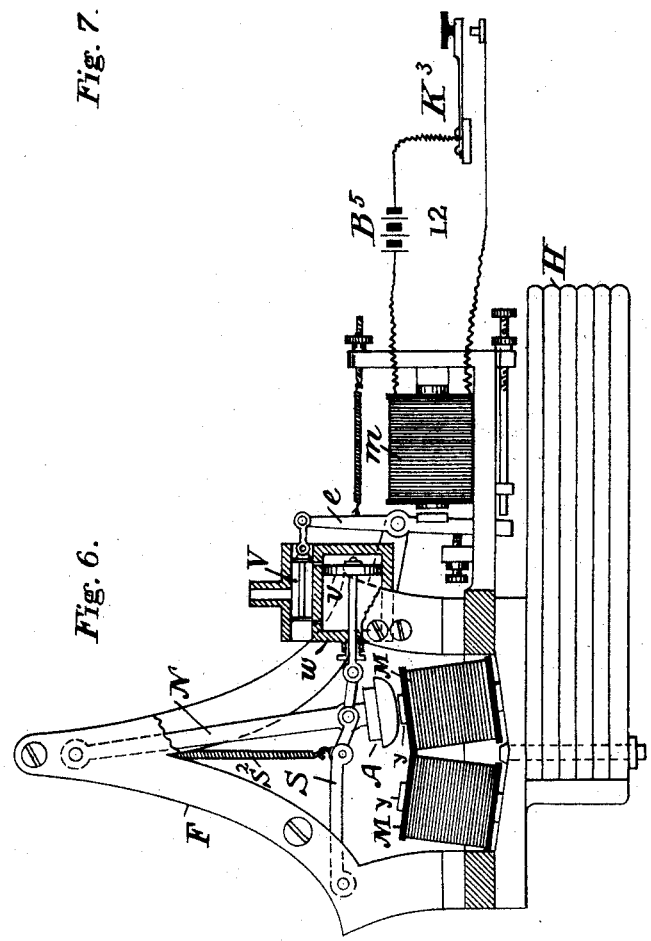
Figure 8:
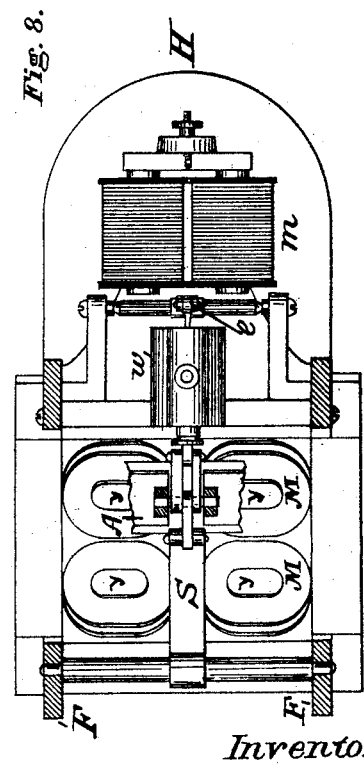

In the drawings which illustrate this specification, Figure 1 is a diagram illustrating the connections of one terminal station of my composite system of circuits. Fig. 2 indicates the composite system complete, showing the connections of both terminal stations with the two line conductors which are used in common by all four of the circuits. Figs. 3, 4, and 5 relate to a polar relay which I employ as the receiving instrument for the fourth or additional circuit, Fig. 3 being a side elevation thereof, Fig. 4 a cross-sectional elevation on the line $x\,x$, and Fig. 5 a plan view of one end of the relay, including the rocking-arbor and armature pivots. Fig. 6 is a sectional side elevation of a special transmitting appliance which I have devised for the development of current impulses of requisite character and for the transmission of the curve signals involved in the operation of the fourth circuit and to which the above-mentioned polar relay is organized to respond. Fig. 7 is a detail end view of the said transmitter, looking from the left end of Fig. 6. Fig. 8 is a plan view of the said transmitter, also partly in section.

Referring to the diagrams of circuit connections, Figs. 1 and 2, L and $L^2$ are the main or line conductors, serving in common for the four main circuits of the system.

C indicates the metallic telephone-circuit, formed of the conductors $L\,L^2$, serially arranged to serve as the two sides thereof. This circuit contains the telephones T and considered as a telephone-circuit only may be traced from the point 2 at station X through the condensers $c\,c^2$ and the telephone there to point 3, then over conductor L to station Z, from point 4 through the condensers $c^3$ and $c^4$ and the telephone to point 5 at that station, and by way of the second main conductor $L^2$ back to the starting-point 2.

$C^2$ and $C^3$ are independent grounded or earth-completed telegraphic circuits having for their respective main conductors the line-wires $L\,L^2$ severally. Each contains at each of its terminal stations a transmitting-key K, a receiving-relay R, and a suitable impedance, such as a retardation-coil $r$, and since both circuits are similarly constructed and arranged it will be sufficient to trace but one of them. Beginning at the earth connection G at station X the circuit $C^2$ is traceable through the terminal earth-wire $g$, points $b^3$ $b^2$, battery B, connecting-wire $b$, and the key K and relay R in circuit therewith, point 6, retardation-coil $r$, point 3, thence over main conductor L to station Z, where from point 4 the circuit continues through the relay, key, and retardation-coil of the said station Z to the terminal ground G thereof.

B $B^3$ are batteries for the circuit $C^2$, and $B^2$ $B^4$ are batteries for the circuit $C^3$ at the stations X and Z, respectively.

It will of course be understood by those skilled in the art that each key is provided with a suitable circuit-closer $s$, whereby the circuit shall be closed at the key of the receiving-station. At each station a shunt-conductor $b^4$, containing a condenser $h$, is provided for each telegraphic circuit and extends between the points of 6 and $b^2$, shunting the key, relay, and battery of the circuit.

The connections and instrumentalities thus far described comprise the standard composite transmission system, and their operation considered alone is well understood. To aid in the more perfect operation of this system, however, it has been the practice to extend an earth branch, including an impedance-coil, from each telephone-terminal. Retaining the earth branches, I dispense with the said impedance-coils, substituting for them the two coils $q$ and $q^2$, respectively, of a special receiving-relay Q, which coils have each an impedance similar to that of the coil whose place it takes. I also bridge the keys of the two telegraphic circuits each by a conductor $d$, containing a condenser $h^2$, a retardation-coil $r^2$, and a magnet-coil $q^3$ or $q^4$, arranged to influence the armature $a$ of the special relay. This point of the organization constitutes the receiving element of my additional circuit $C^4$, which has for its line conductor the two main wires $L\,L^2$, coupled in parallel for the passage of currents of like direction in both. The relay-coil $q$ is connected in the earth-branch extension $f$ of conductor L and the coil $q^2$ in the similar extension $f^2$ of conductor $L^2$, so that the telephonic circuit-condensers $c\,c^3$ are also interposed practically in the parallel branches $f\,f^2$ of the fourth transmission-circuit $C^4$, which circuit, it will be seen, has both conductors grounded at the terminal stations X and Z, each at the point G, from which they diverge at points $b^5\,b^6$, each then continuing by way of one coil of the relay Q, one condenser $c$, point 2 or 3, and to its own main line and the other station. The relay-coils are so connected with their line conductors that currents of similar direction in the said lines have opposite effects in the said coils, weakening the magnetic effect on one of the cores and strengthening the other, as in ordinary practice.

At each terminal station there is necessarily a transmitting apparatus for the development and transmission of the currents to which the relays Q are designed to respond for the operation of the extra or fourth circuit of the composite system, and such a transmitter J is symbolized by the double-coil Hughes magnet $i$ and its key-armature A, the former of which has one of its coils, 6, in circuit with conductor L and the other, 7, with conductor $L^2$.

Referring now to Figs. 6, 7, and 8, I will describe in detail a form of transmitting apparatus which I have devised and which is well adapted for the operation of the fourth or added circuit of the improved composite system. It comprises a powerful Hughes magnet composed of a compound permanent magnet H, which has two electromagnetic coils and soft-iron cores mounted on each of its poles. F is the frame of the transmitting apparatus, and A is the soft-iron armature for the magnets M and is pendulously suspended by the rods or links N from the suspending-bar P. When the armature A is caused to swing on its pivots, it passes to and fro in close proximity to the ends of the soft-iron electromagnet-cores $y$. In making its excursions the armature is propelled by compressed air, acting through a piston $v$, which moves in the air-cylinder $w$, the air being controlled and the movements of the armature being therefore governed by the action of a balanced valve V, attached to the armature-lever $e$ of an electromagnet $m$ in the local circuit 12 of the battery $B^5$. A key $K^3$ in the circuit of this electromagnet serves as a manipulator whereby Morse or other signals can be reproduced in the motions of the pendulously-supported armature through the progressive intermediation of the electromagnet $m$ and its armature, the balanced valve V, and the air-cylinder and its piston. When at rest, the armature lies over and close to one of the pairs of poles $y$ of the magnets M, and is rigidly held there by air-pressure exerted on one side or the other of the piston of the air-cylinder. The excursion of the armature is limited by means of a toggle-jointed lever S, to which is attached a spiral spring $S^2$, arranged to exercise a vertical tension on the armature. In a state of quiescence, therefore, the armature is held by a strain conjointly exerted in a longitudinal and also a lateral direction. When by movement of the governing-valve air-pressure is changed from one side to the other, the armature begins to move in virtue, first, of the upward pull of the helical spring, and, second, by means of the air-pressure. When the armature has completed one-half of its excursion, the tension of the helical spring ceases to be an accelerating and becomes a rapidly-increasing retarding agency.

By the construction shown and described the armature starts slowly, and rapidly accelerates its speed until half of its excursion has been completed, when it commences to slow down at precisely the same rate at which its acceleration was accomplished until it finishes its period or excursion without any jar or irregular action.

The transit of the armature A over the poles of the magnets M causes a disturbance and redistribution of the lines of force of the said magnets, and thus generates electromotive forces in the helices surrounding the cores, which electromotive forces produce corresponding currents when the said helices are connected up in a closed circuit. The said helices of the magnets are wound with two separate wires 6 and 7, as indicated in Fig. 1, and these wires are connected in the circuit of the two main conductors L and $L^2$ of the telephonic circuit, respectively, in such manner that equal and similar currents appear in both of the said main conductors simultaneously. The currents so induced pass over the lines between the ground connections at the terminal stations through the specially-constructed high-impedance polar, relays to which reference has hereinbefore been made and which will presently be described more in detail. These currents produce no sounds in the telephones at either station, being uniformly smooth in definition, and for the reason also that the telephone-terminals for these currents are points of equal potential and the currents themselves of the same sign, and as they have a duration of about half only of that required to produce a dot of the Morse code they are readily prevented by the retardation-coils and condensers of the two original telegraphic circuits $C^2$ and $C^3$ from disturbing relays of the said circuits or from affecting them at all to an appreciable extent.

Figs. 3, 4, and 5 illustrate the construction of the relay Q. (Indicated in the diagrams, Figs. 1 and 2.) It is a polar relay and is so designed that its electromagnetic helices shall possess very great impedance without involving any consequent loss in its delicacy of action. Each of the steel permanent magnets $H^2$ forms a closed magnetic circuit through the soft-iron core O of its own particular electromagnetic coil $q$, which core is screwed at its ends to the poles of the said magnet, respectively. The permanent magnets are also fitted with polar projections $y^2$ $y^3$, secured to their ends and projecting therefrom substantially at a right angle and nearly meeting at the middle of the spool, which, with the exception of a central gap, is overlapped by the said pole-pieces. Thus the magnets $H^2$ have a closed magnetic circuit through the center of their respective spools and a nearly-closed magnetic circuit round the outer side of the said spools. I place two of the magnets at each end of the instrument and provide them with the usual adjusting devices. Two of the helices, $q$ $q^2$, as in the diagrams, are the main-circuit coils, to be connected in the extension-conductor $f$, and the other two, $q^3$ $q^4$, are the influencing-coils in the conductors $d$, which shunt the Morse-telegraph keys. In the space between the polar projections of the two sets of magnets is hung on pivots at $o$ an armature $a$, carrying a subarmature $a^2$ for the magnets on one side and a second $a^3$ for those on the other. An armature-lever $a^4$ is common to both and is adapted to oscillate between the limiting-stops 12 and 13, one of which, 12, is the contact-stop of a local circuit (not shown) controlled by the movements of said lever and containing any suitable receiving instrument in a manner well understood.

In the operation of my composite system when the key K at any station is depressed the circuit controlled by it ($C^2$, for example) is closed and a current from the appropriate battery B flows to line L by way of the relay R and impedance-coil $r$, both shunted by the condenser $h$, and then through one of the windings 6 of the special transmitter of circuit $C^4$ to the apparatus of the distant station. This current being graduated or smoothed out in the usual manner does not appreciably affect the telephones T, which are connected between conductors L $L^2$ through the condensers $c$. A precisely similar cycle of operations results, of course, from the manipulation of any other of the keys K. The high impedance of the coils $q$ and $q^2$ of the special polar relay Q of the fourth circuit $C^4$ further aids in differentiating the operation of the several circuits and acting in a marked way to obstruct any leakage through the earth-branch conductors $f f^2$ of the voice-currents circulating in the telephone-circuit C for the operation of the telephones T.

When the key $K^3$ of the transmitting apparatus J is manipulated and the soft-iron armature A is thereby moved over and in close proximity to the poles of the magnet M, momentary induced currents of short duration are set up in the coils surrounding the cores forming the said poles. These currents are equal and similar in both wires of the said coils and flow in the same direction in both main conductors. They therefore do not disturb the telephones T at all, the potential at both terminals of the said telephones being the same, and the forces consequently being balanced. The impedance-coils $r$ obstruct the passage of these currents in the direction of the relays R or their shunts $b^4$, so that they are prevented from finding passage to earth through the terminal extensions of the telegraphic circuits $C^2 C^3$. They are thus restricted to their own circuit through the coils $q q^2$ of relay Q at either end of the line, and these coils being connected so as to aid one another, with currents of either direction, act unitedly upon the armature $a$, enabling it in its oscillations to close a local circuit and record, sound, or display a telegraphic or other signal in any usual manner. The office of the two remaining electromagnet-coils $q^3$ and $q^4$ and the magnets on which they are mounted (the said coils being contained in the shunts $d$) is to correct any minor irregularities which may result from a surge of the telegraphic currents from the keys K through the condensers $c$. When, for instance, a key K is open, its condenser $h^2$ will require a charge, which when the said key is closed will discharge through the relay-coil $q^3$ or $q^4$ and the impedance-coil $r^2$, and the said discharge will act antagonistically to any discharge through the corresponding coil $q$ or $q^2$ from the condenser $c^2$ or $c$, and false signals will thus be prevented.

I claim—

1. In a system of composite and simultaneous telegraphy and telephony, the combination with a metallic or double-conductor telephone-circuit; and two independent grounded telegraphic circuits, each having as its respective line conductor, one of the two conductors respectively of the said metallic circuit; of a third telegraphic or signaling circuit, having its line conductor composed of the said two conductors of the said metallic circuit connected in parallel or multiple arc; substantially as described.

2. A composite system of one telephonic circuit, and three telegraphic circuits, formed of two main conductors; the said conductors serving severally as the line conductors of two of the telegraphic circuits; being connected in parallel to constitute the third telegraphic circuit; and being connected in series to constitute the metallic telephone-circuit; substantially as described.

3. The combination with a system of simultaneous telephony and telegraphy comprising a metallic telephone-circuit, and two earth-completed telegraphic circuits having for their line conductors the two main conductors respectively of the said telephone-circuit; of an additional grounded circuit formed likewise of the same two main conductors arranged in parallel; a magneto-transmitter therefor, having its generating-coils so connected with the main conductors as to establish currents of like direction simultaneously in both; and a high-impedance electromagnetic relay or receiving apparatus therefor; the said transmitter and receiver both having their operative coils coöperatively connected, half in one main conductor and half in the other; substantially as described.

4. The combination with a system of simultaneous telephony and telegraphy comprising a metallic telephonic circuit; and two earth-completed telegraphic circuits, having for their line conductors, the two main conductors respectively of the said telephone-circuit, and having each a transmitting-key in its earth-terminal extensions; of a shunt for each key containing a condenser; an additional grounded telegraphic circuit composed of the said two main conductors in parallel; and a polarized receiving-relay for the said additional circuit having two operative and two corrective electromagnets, the helices of the opertive magnets being connected coöperatively in the circuit of the two main conductors respectively, and those of the corrective magnets in the said shunt-conductors of the said transmitting-keys respectively; substantially as specified.

5. In a polarized relay the combination of a permanent U-magnet; a soft-iron core uniting the poles thereof to form a permanently-closed magnetic circuit; an electromagnetic exciting-helix surrounding the said core; and pole-pieces for the said magnet, extending into close proximity to one another, and overlapping the said helix, as described.

6. A polarized relay comprising a plurality of permanent U-magnets; a soft-iron core uniting the poles of each, and forming therewith a permanently-closed magnetic circuit; an electromagnetic helix surrounding each of the said cores; pole-pieces one for each pole of each of the said magnets attached thereto, overlapping the outside of said helix, and closely approaching each other; and an armature pivoted between the said magnets, and presenting an inductive face toward the pole-pieces of both; substantially as shown and described.

In testimony whereof I have signed my name to this specification, in the presence of two subscribing witnesses, this 21st day of December, 1897.

STEPHEN DUDLEY FIELD.

Witnesses:
GEO. WILLIS PIERCE,
ANNA C. BROWN.